March 1, 1966     M. S. BEDNAR ETAL     3,237,240
FISH SCALING BASE WITH IMPROVED HOLDDOWN MEANS
Filed Aug. 5, 1964
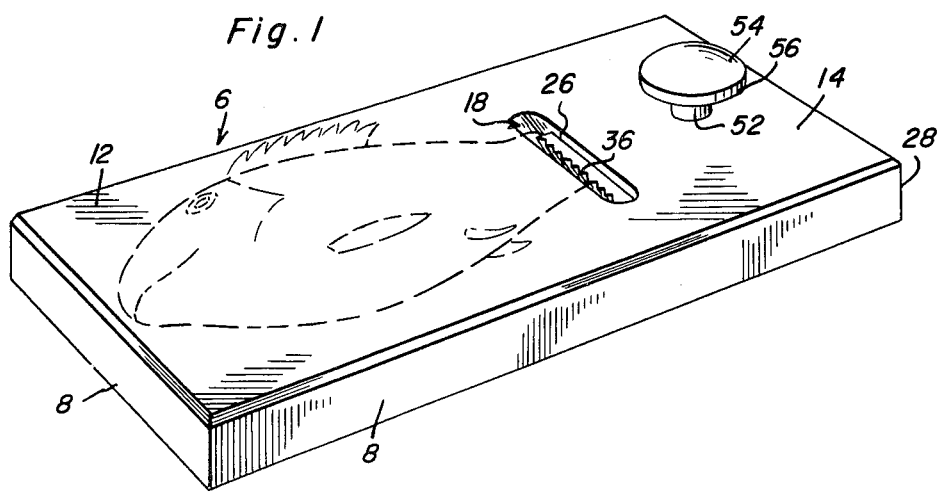
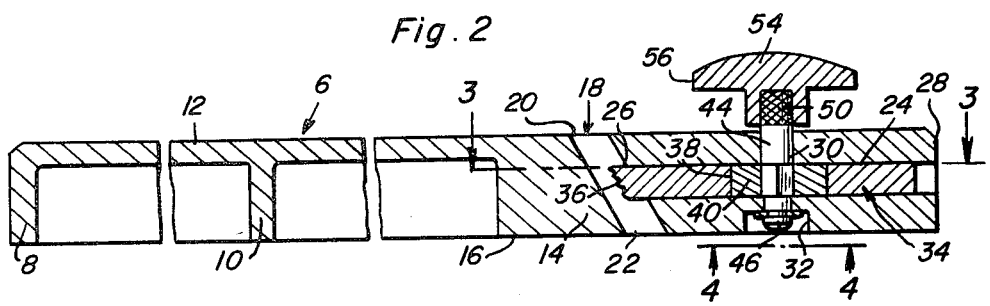
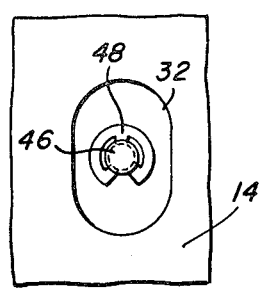
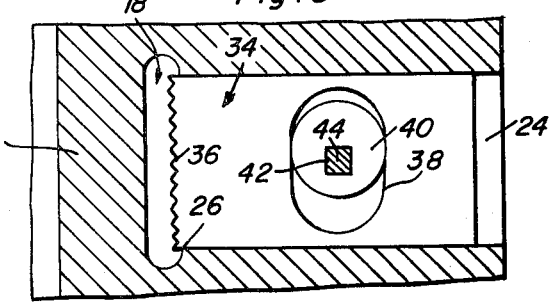
Michael S. Bednar
Perry Volpone    INVENTORS
BY *O'Brien and Jacobson*
                 Attorneys

3,237,240
FISH SCALING BASE WITH IMPROVED HOLDDOWN MEANS

Michael S. Bednar, 9901 Orleans Ave., Cleveland, Ohio, and Perry Volpone, 7341 Presley Ave., Mentor, Ohio
Filed Aug. 5, 1964, Ser. No. 387,620
3 Claims. (Cl. 17—8)

This invention relates to a portable fish positioning and supporting and holddown device through the medium of which a fish can be properly and securely held for scaling and cleaning.

It is common in this field of endeavor to provide an elongated board, panel or an equivalent base atop which the fish is laid for scaling and cleaning. To assist the user, it is also common practice to provide tail clamping means of one type or another usually at one end of the base.

An object of the present invention is to provide a structurally different adaptation which is simple, practical, easy-to-use and which effectually serves the purposes for which it is intended.

Briefly, the present invention is characterized by a base panel which has an oblique angled slot at one end portion into which the tail of the fish is quickly inserted and clampingly held. Novel clamping means is built into said one end portion in a manner to clamp and hold the tail in the anchoring slot.

More specifically the improved device comprises a horizontally elongated base embodying a panel having a planar top surface atop which the fish is adapted to be positioned and firmly supported, said panel being provided adjacent one end portion with a transverse oblique angled slot for reception and temporary anchorage of the flexible bent-down tail of the fish, a tail clamping blade slidingly keyed in said one end portion, said blade having a forward end fashioned into a projectionable and retractable jaw and said jaw projecting into said slot.

As will be hereinafter evident the device is of a self-contained type wherein a simple and efficient reciprocable block-like clamping blade is substantially concealed and out of the way. Only the cam operating knob is above the top surface of the panel-type base. The shaft and its knob can be readily applied and removed. The clamping blade and accompanying cam can likewise be expeditiously inserted and removed. Accordingly, the device is such that it well serves the needs of those who are called upon to expeditiously scale fish in a highly desirable and efficient manner.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective of a fish scaling device constructed in accordance with the principles of the present invention and showing, in phantom lines, the manner in which the fish is positioned and clamped atop the base for quick and easy scaling;

FIG. 2 is a view on a suitably enlarged scale taken approximately through the longitudinal center of the device shown in FIG. 1; and FIGS. 3 and 4 are fragmentary detail sections taken on the section lines 3—3 and 4—4, respectively, of FIG. 2.

Referring now to the views of the drawing and particularly to FIG. 1, it will be observed that the portable base 6 comprises a substantially rectangular one-piece panel. This base may be made from wood, from light-weight non-corrodible metal or from moldable plastic material. The forward end portion as shown in FIG. 2 is preferably hollow and embodies a depending marginal flange 8 and a transverse reinforcing rib or web 10. The forward end portion is denoted by the numeral 12 and the rearward end portion by the numeral 14. This rearward end portion as better shown in FIG. 2 is substantially solid and the overall bottom 16 is flat. The rearwardly and downwardly canted or oblique angled slot is denoted at 18, the upper open end 20 opening through the flat top surface and the lower end 22 opening through the bottom flat side or surface 16. In practice this slot is of the approximate size or dimension shown, has rounded end portions and extends transversely or at right angles to the lengthwise dimension of the panel. It is preferably centralized, that is placed midway between the longitudinal edge portions of the panel. The numeral 24 designates a second complemental slot which is horizontally disposed and is arranged midway between the top and bottom surfaces of the base and the forward end 26 of the slot opens into the midway portion of the tail inserting and anchoring slot 18. The rearward end opens through the rear end portion 28 of the panel. This rearward end portion is also provided with a vertical bore 30 which constitutes a bearing, the bottom thereof being counterbored as at 32 to provide a recess. The slot 24 serves to accommodate a substantially rectangular plate or block-like member which constitutes and provides a clamping blade 34. This blade is commensurate in length with the length of the slot 24. The forward end of the blade is beveled downwardly as at 36 and is serrated and constitutes a projectable and retractable tail clamping jaw. The projected clamping position of the jaw is shown in FIGS. 1 to 3 inclusive. The blade is precision fitted in the slot 24 but is capable of being worked back and forth with requisite efficiency. As shown in FIG. 3 the median portion of this clamping blade is provided with a transverse substantially ovate cam accommodating opening 38. A disc-like cam 40 is fitted into the opening and is of required cooperating size. The cam is provided eccentrically with a square or suitably non-circular hole 42 for reception and retention of a corresponding square portion of the vertical cam actuating shaft 44. The lower end portion 46 of the shaft depends into the recess 32 where it is provided with a groove to accommodate the assembling and retaining horseshoe shaped washer 48 (see FIG. 4). The knurled upper end of the shaft 50 is fitted into a socket member 52 provided therefor on the bottom of the hand turned knob 54. In practice the margin or periphery of the knob 56 will be suitably knurled or otherwise milled. With these component parts assembled in the manner shown and described it will be obvious that when the user catches hold of the knob and turns it the clamping blade 34 and consequently the jaw 36 will be operated to accomplish the desired tail clamping step.

In using the device it will be evident that the fish which is to be scaled and cleaned is positioned or placed flatwise on the top surface of the base. The flexible tail of the fish is then bent down and tucked into the anchoring slot 18 by way of the open top 20. At this time it is to be assumed that the jaw 36 is retracted. With the tail suitably inserted the user catches hold of the knob 54 and turn it in the correct direction to feed the jaw into the slot and to clampingly grip and hold the tail of the fish. When one side of the fish is scaled the jaw is released, the fish is turned over and the tail is again inserted into the slot 18 and clamped in the manner just described.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fish holddown and scaling device comprising a horizontally elongated base panel having a planar top surface atop which the fish is adapted to be laid flatwise and firmly supported, said panel being provided adjacent one transverse end portion with an oblique angled slot for reception and temporary anchorage of the flexible bent-down tail of the fish, said panel being further provided at said one end portion with a second slot complemental to and at right angles to said first slot and having a forward end opening into and communicating with the first slot midway between the upper and lower open ends of said first slot and having its rearward end opening through the rearward end of said panel, said second slot being in a horizontal plane parallel with and between the planes of the top and bottom surfaces of said panel and constituting and providing a keyway, said rear end portion also having a vertical bore intersecting the median part of said second slot and providing a shaft bearing, an elongated tail clamping and securing blade slidingly and removably keyed in said second slot and having a forward end bevelled downwardly, serrated, projecting into said first slot and providing a tail gripping jaw, a median portion of said blade having a transverse ovate opening aligned with said bore, a disk-type cam seated and turnably lodged in said opening with its peripheral edges movably contacting the opposed long edges of said opening, said cam having an eccentric hole therein, a vertical shaft journalled in said bore and having a lower portion keyed in said hole for rotating said cam, and an upper end portion projecting above the plane of said top surface and provided with a finger gripping knob.

2. A fish holddown and scaling device comprising a base embodying a horizontally elongated rigid panel having a planar top surface atop which a fish is adapted to be laid lengthwise and firmly supported, said panel provided adjacent one end portion with an oblique angled slot of a length and width for reception and temporary anchorage of the bent-down tail of the fish which is to be scaled, a tail clamping blade substantially concealed and slidingly but removably keyed in said one end portion, said blade having one end provided with a projectable and retractable jaw and said jaw projecting normally into said slot, said panel provided at said one end portion with a second slot constituting and providing a keyway, said blade being adjustably keyed in said keyway, said blade having an opening, a cam operatively fitted into and turnable in said opening, and manually actuatable means for turning said cam, said means comprising a vertical shaft rotatable in a bearing provided therefor in said one end portion, said shaft having a lower end eccentrically joined to said cam and an upper end portion projecting above said top surface and provided with a finger grippable shaft turning knob.

3. A fish holddown and scaling device comprising a horizontally elongated base panel having forward and rearward end portions, said rearward end portion being solid and having flat top and bottom surfaces and further provided with an oblique angled slot spaced from and parallel with one marginal edge portion and having its ends terminating inwardly of the respective longitudinal edge portions of said end portion and opening through the top and bottom surfaces, respectively, of said end portion, said rearward end portion being provided midway between the top and bottom surfaces of the panel with a second slot having a rearward end opening through the rearward end of said panel and having a forward end opening through one lengthwise edge portion of said first slot, said rearward end portion also having a vertical bore opening through the top and bottom surfaces of said end portion and providing a shaft bearing, an elongated tail clamping and securing blade slidingly and removably keyed in said second slot and having a forward end which is beveled downwardly, is serrated, projects into said first slot and provides a fishtail gripping jaw, a median portion of said blade having a transverse ovate opening aligned with said bore, a disk-like cam seated and turnably lodged in said opening with its peripheral edges movably contacting the opposed longitudinal edges of said opening, said cam having an eccentric hole therein, a vertical shaft journaled in said bearing and having a lower end portion keyed in said hole for operating said cam, and an upper end portion of said shaft projecting above the top surface of said panel and being provided with a finger-gripping knob.

References Cited by the Examiner

UNITED STATES PATENTS

| | | | |
|---|---|---|---|
| 926,582 | 6/1909 | Meredith | 17—8 |
| 1,268,094 | 6/1918 | Clarke | 24—134 |
| 1,618,170 | 2/1927 | Cheshire | 24—263 |
| 1,867,133 | 7/1932 | Bisset | 17—5 |
| 1,944,603 | 1/1934 | Hecker | 24—134 |
| 2,026,251 | 12/1935 | Rowton | 17—3 |

SAMUEL KOREN, *Primary Examiner.*

LUCIE H. LAUDENSLAGER, *Examiner.*